United States Patent [19]

Zintler

[11] Patent Number: 4,585,981
[45] Date of Patent: Apr. 29, 1986

[54] DEVICE FOR DRIVING MOTOR-OPERATED CLOSURE PARTS

[75] Inventor: Albert Zintler, Furstenfeldbruck, Fed. Rep. of Germany

[73] Assignee: Webasto-Werk W. Baier GmbH & Co., Fed. Rep. of Germany

[21] Appl. No.: 649,293

[22] Filed: Sep. 11, 1984

[30] Foreign Application Priority Data

Sep. 12, 1983 [DE] Fed. Rep. of Germany ....... 3332877

[51] Int. Cl.[4] .............................................. G05B 5/01
[52] U.S. Cl. ................................... 318/615; 318/563; 318/266; 318/278; 318/282
[58] Field of Search ............... 318/615, 616, 563, 565, 318/266, 265, 267, 282, 278; 361/31

[56] References Cited

U.S. PATENT DOCUMENTS

| 4,139,811 | 2/1979 | Klinger | 318/615 |
| 4,153,865 | 5/1979 | Cohen et al. | 318/616 |
| 4,220,900 | 6/1978 | Mintz | 318/266 |
| 4,412,162 | 10/1983 | Kitamura | 318/563 |
| 4,438,972 | 3/1984 | Katayama et al. | 318/266 X |
| 4,453,112 | 6/1984 | Sauer et al. | 318/282 X |

FOREIGN PATENT DOCUMENTS 1110282 7/1961 Fed. Rep. of Germany .

Primary Examiner—B. Dobeck
Attorney, Agent, or Firm—Sixbey, Friedman & Leedom

[57] ABSTRACT

A device for driving a motor-operated closure part for an opening, especially on a motor vehicle, having a protective circuit for interrupting the closing movement when there is an indication that an object may be obstructing closure of the opening. A speed transmitting means exists that detects the adjusting speed of the closing part on at least one range of the adjusting path of the closure part that is critical with respect to the engagement of an obstruction. In addition, an evaluating stage is provided that responds to the speed signal and/or its rate of change with respect to time, for producing an obstruction signal that activates a control means of the circuit to interrupt the closing movement.

20 Claims, 5 Drawing Figures

DEVICE FOR DRIVING MOTOR-OPERATED CLOSURE PARTS

BACKGROUND AND SUMMARY OF THE INVENTION

This invention relates to a device for driving motor-operated closure parts, especially on motor vehicles, having a protective system for interrupting the closing movement when an object is situated in the opening so as to be squeezed by the closing parts.

For a protection system against the squeezing of an object, which operates without additional components located outside the drive control, such as proximity switches, various solutions have been suggested. It is, for example, known (German Patent No. 1 110 282 and U.S. Pat. No. 4,220,900) to monitor the current of the driving motor for a closure part, such as a sliding roof, sliding-lifting roof or window of a motor vehicle and to evaluate the rise of the motor current, when an obstruction is encountered, in order to send a signal to the protection system for interrupting the closing movement. However, such a type of evaluation cannot prevent a considerable squeezing force from having already been exerted on the object to be protected, especially on fingers and other parts of the body, before the arrangement responds.

The invention, therefore, has a primary objective of creating a device that ensures increased safety and can be constructed with relatively simple means.

This objective is achieved by means of a speed transmitting means which detects the adjusting speed of the closure part in at least one range of the movement path of the closure part that is critical with respect to the squeezing problem and by means of an evaluating stage responding to the speed signal and/or its rate of change, for producing an obstruction signal that activates the protection system.

The invention is based on recognition of the fact that motor-driven closure parts, such as sliding roofs, motor vehicle windows and doors, apart from the initial acceleration and the final braking, are driven at an essentially constant speed. However, the speed of a closing part will suddenly decrease when the closure part encounters an object. A speed signal that is proportional to the closing speed, therefore, represents a reliable indicator of the danger that an obstruction has been encountered.

In accordance with a further feature of the invention, an actual-value position transmitting means is provided that detects the actual position of the closure part, and a differentiating stage is connected to said actual-value position transmitting means for forming the speed signal. In this manner, a speed signal can be obtained simply and reliably. In order to determine speed changes which indicate the start of an object being squeezed, the speed transmitting means is expediently provided with a differentiating stage for forming an acceleration signal that corresponds to the acceleration or deceleration of the closure part.

The position signal and the signals derived from it, i.e., preferably the speed signal and the acceleration signal, are not influenced by disturbances, such as the ambient temperature, the condition of the driving mechanism and the motor current. However, in order to, in the case of voltage fluctuations which occur frequently in the case of motor vehicles, be able to differentiate clearly between the possibility that an object is being squeezed and the alternative possibility that a voltage drop has occurred, the evaluating stage may advantageously also be acted upon by a driving current or a driving voltage signal coming from a transmitting means detecting the current or the driving voltage of the driving motor.

Closure parts, such as a sliding panel and windows or doors of motor vehicles, as a rule, when attaining their closed position, are pressed against a sealing means or similar means which decrease the closing speed, without the continued existence of a danger that such occurred due to an object having been encountered. In order to avoid an undesirable response of the protection system during such final stages of movement, a further aspect of the invention lies in the response sensitivity of the protection system being changed as a functional of the actual position of the closing part. The arrangement may, for example, be made in such a way that the protection system is deactivated in at least one predetermined range of the path of movement of the closing part.

Changes of the speed of movement of a closure part that are caused by possible disturbances during an opening movement, in contrast to speed changes occurring during a closing movement, do not represent the danger that an obstruction has been encountered. In order to ensure that the protection system is activated only during a closing movement, the evaluating stage, expediently, has a logic circuit for recognizing a closing movement.

In the case of known sliding/lifting roofs, starting from a positive where the roof opening is fully closed by a roof panel, opening movement of the roof panel under action of the motor drive occurs in both directions, i.e., one direction for tilt-out lifting of the roof panel and an opposite direction for sliding retraction. In such a case, the evaluating stage preferably has a logic circuit for differentiating between the tilt-out lifting and sliding ranges.

The evaluating phase is advantageously provided with circuit components for suppressing insignificant signal fluctuations. In particular, these may be window comparators.

The drive advantageously, in a known manner (U.S. patent application Ser. No. 530,714) is part of a control circuit provided with a desired-value position transmitting means which compares the position of the closing part selected at the desired-value position transmitting means with its actual position and adjusts the position of the closing part until the deviation has become zero.

The arrangement can be designed so that the drive is stopped in response to an obstruction signal; however, a preferred design is to reverse the drive in response to the obstruction signal, i.e., automatically change the drive operation from a closing movement to an opening movement.

DETAILED DESCRIPTION OF THE PREFERRED EMBODIMENT

Figure 1:
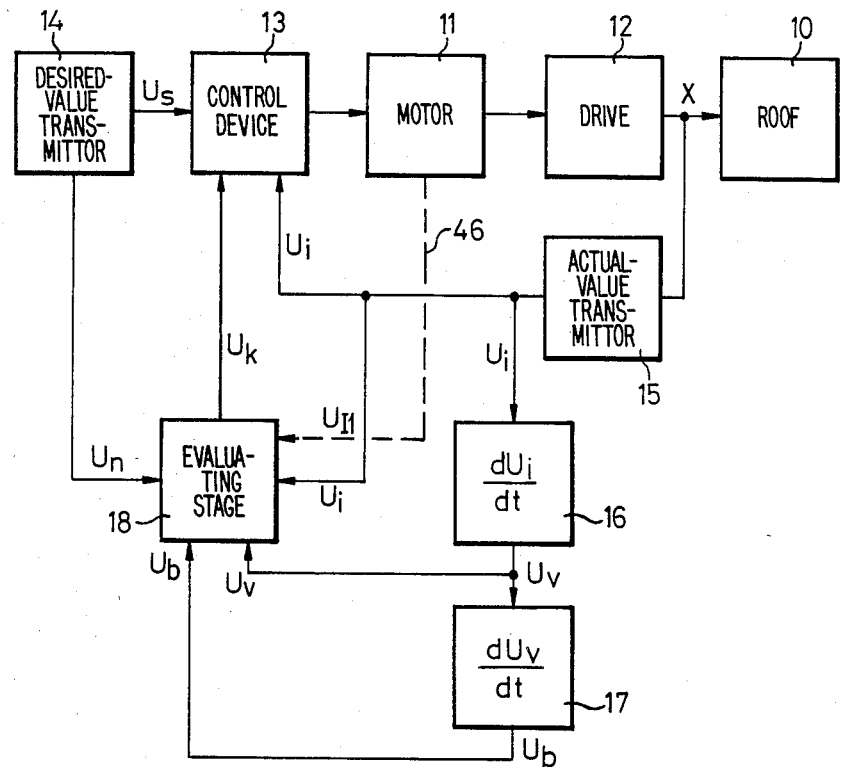
FIG. 1 is a block diagram of a driving device designed according to the invention for a motor-driven lifting/sliding roof.

According to FIG. 1, a sliding/lifting roof panel 10, represented as a block, is displaceable by a driving motor 11 via a drive 12, for example, in the form of pressure-resistant thread cables, said thread cables engaging with a pinion driven by the motor 11. The motor 11 is controlled by a control device 13 that receives a desired-value position signal $U_s$ from a desired-value position transmitting means 14. The actual position X of the movable roof panel 10 is detected by an actual-value position transmitting means 15 which produces a corresponding actual-value position signal $U_i$ which, in the control device 13, is compared with the desired-value position value $U_s$. Such an arrangement is described in detail in U.S. patent application Ser. No. 530,714, filed Sept. 9, 1983 and assigned to the assignee of the present application. Therefore no further discussion of this aspect will be made and reference may be made to the noted application to the extent necessary.

In addition, the actual-value position signal $U_i$ is directed to a first differentiating stage 16 which, by differentiating this signal, forms a speed signal $U_v$. A second differentiating stage 17 is connected to the differentiating stage 16. The second differentiating stage 17 differentiates the speed signal $U_v$ to derive an acceleration signal $U_b$. The actual-value position signal, $U_i$, the speed signal, $U_v$, and the acceleration signal, $U_b$, are directed to an evaluating stage 18 which, as a function of the presence of indicated combinations of the input signals, generates an obstruction signal $U_k$. The obstruction signal, $U_k$, is directed to the control device 13 which causes a reversal of the rotating direction of the driving motor 11. So that the evaluating stage 18 can differentiate between the lifting and the sliding range of the roof panel 10, a signal $U_n$ is applied to another input of the evaluating stage 18, said signal $U_n$ corresponding to the closed or neutral position of the roof panel 10.

Figure 2:
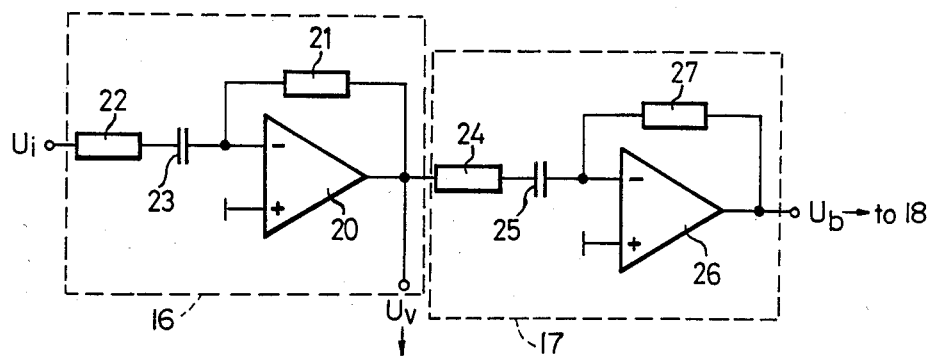
FIG. 2 is a diagram of the differentiating stages for deriving a speed signal and an acceleration signal from a position signal.

According to FIG. 2, the differentiating stage 16 has an operational amplifier 20, the non-inverting input of which is grounded, while a resistor 21 leads back from the output to the inverting input of the operational amplifier. A series connection consisting of a resistor 22 and a condenser 23 is connected to the inverting input of the operational amplifier 20. The position signal $U_i$ is applied to the input side of the resistor 22. This position signal $U_i$ is differentiated into the speed signal $U_v$ at the output of the operational amplifier 20. The output of the operational amplifier 20, via a series connection consisting of a resistor 24 and a condenser 25, is connected with the inverting input of an operational amplifier 26 of the second differentiating stage 17. A resistor 27 is disposed between the output and the inverting input of the operational amplifier 26. The non-inverting input of the amplifier 26 is grounded. In this way, the speed signal $U_v$ is changed into the acceleration signal $U_b$ by differentiating.

Figure 3:
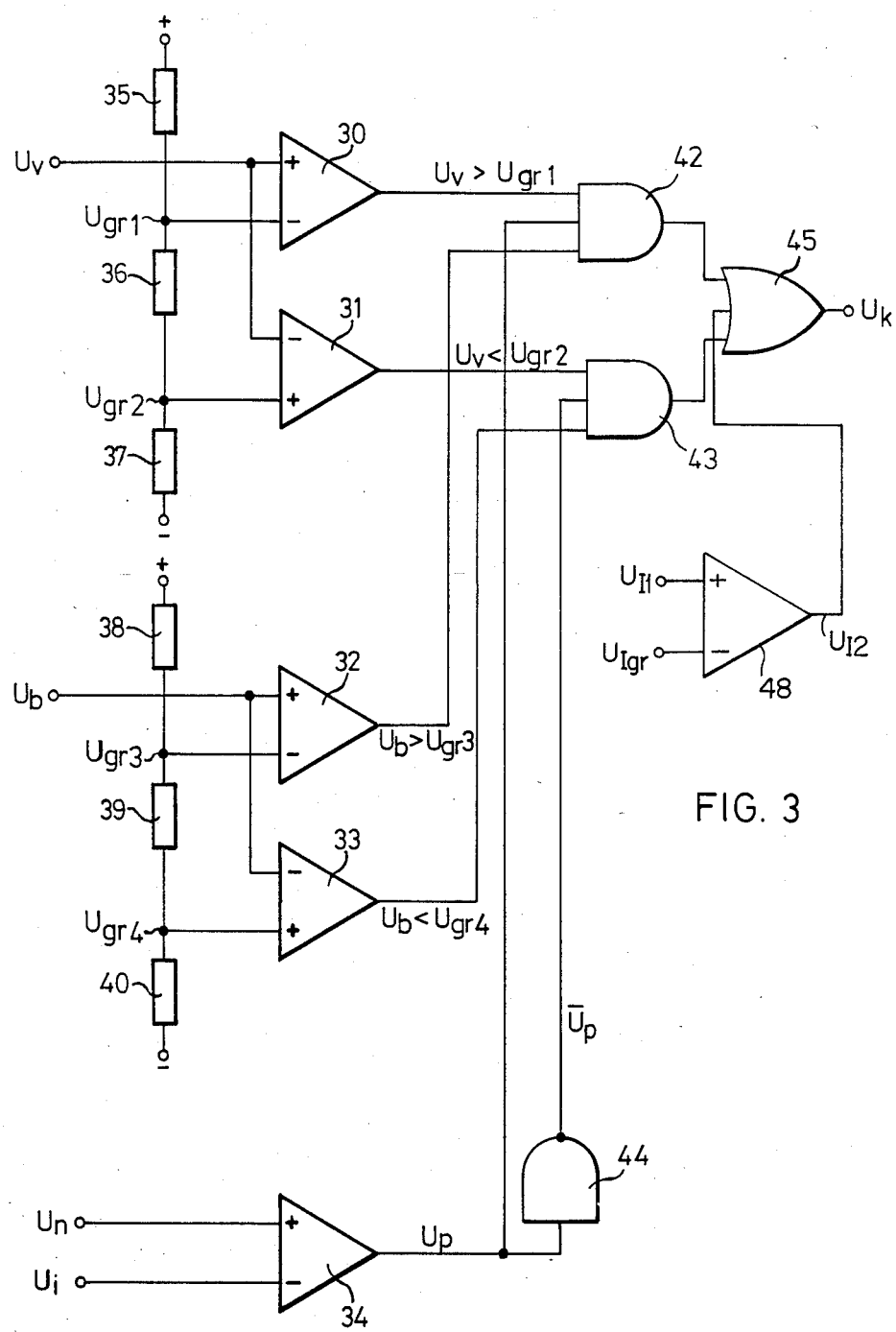
FIG. 3 is a diagram of the evaluating circuit provided in the arrangement according to FIG. 1.

With reference to FIG. 3, the evaluating circuit 18 has a group of operational amplifiers 30, 31, 32, 33 and 34. A voltage divider consisting of resistors 35, 36 and 37 is connected in series to the operational amplifiers 30, 31. In a corresponding manner, a voltage divider with the resistors 38, 39, 40 is located in front of the operational resistors 32, 33. The speed signal $U_v$ is applied to the non-inverting input of the operational amplifier 30 and the inverting input of the operational amplifier 31. The inverting input of the operational amplifier 30 is connected to the connecting point of the resistors 35, 36, while the non-inverting input of the operational amplifier 31 is connected to the connecting point of the resistors 36, 37. The amplifier 30, 31 and the voltage divider 35, 36, 37 together form a window comparator in that, at the output of the operational amplifier 30, a positive signal (logic level: "high") appears when the speed signal $U_v$ is larger than a first predetermined threshold value $U_{gr1}$. Correspondingly, a positive signal (logic level: "high") appears at the output of the operational amplifier 31 when the speed signal $U_v$ is smaller than a second predetermined threshold value $U_{gr2}$. In all other cases, the logic signal level "low" will appear at both operational amplifier outputs.

The acceleration signal $U_b$ goes to the non-inverting input of the amplifier 32 and the inverting input of the amplifier 33. The inverting input of the amplifier 32 is connected to the connecting point of the resistors 38, 39, while the non-inverting input of the amplifier 33 is connected to the connecting point of the resistors 39, 40. The amplifiers 32, 33 and the voltage divider 38, 39, 40 together form a window comparator in that a positive signal (logic level: "high") appears at the output of the operational amplifier 32, when the acceleration signal $U_b$ is larger than a predetermined threshold value $U_{gr3}$. Correspondingly, a positive signal (logic level: "high") appears at the output of the operational amplifier 33 when the acceleration signal $U_b$ is smaller than another predetermined threshold value $U_{gr4}$. In all other cases, the logic signal level "low" appears at both operational amplifier outputs.

The outputs of the amplifiers 30, 31 are connected with an input of an AND-circuit 42 and an AND-circuit 43, respectively. The output of the amplifier 32 is connected to a second input of the AND-circuit 42, while the output of the amplifier 33 is connected with a second input of the AND-circuit 43. The signals $U_n$ and $U_i$ are applied, respectively, to the non-inverting and the inverting inputs of the operational amplifier 34. A signal $U_p$, formed by a comparison of signals $U_n$ and $U_i$, appears at the output of said operational amplifier 34 for differentiation between the lifting and the sliding range of the roof 10. The output of the amplifier 34 is connected to a third input of the AND-circuit 42, and via an inverter 44, is connected with a third input of the AND-circuit 43. The outputs of the AND-circuits 42, 43 and connected to both inputs of an OR-circuit 45, at the output of which the obstruction signal $U_k$ appears.

In the case of the explained circuit arrangement, an obstruction signal $U_k$ is generated when $U_v > U_{gr1}$ and $U_b > U_{gr3}$ as well as $U_i > U_n$ or when $U_v < U_{gr2}$ and $U_b < U_{gr4}$ as well as $U_i < U_n$.

Figure 4:
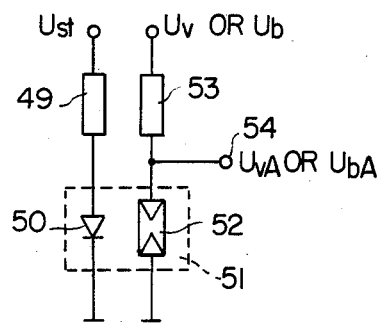
FIG. 4 is a diagram of a circuit for adjusting the response sensitivity of the protection circuit.

Depending on the position of the sliding roof panel, various mechanical resistances can arise, for example, because of friction, which may be perceived mistakenly as instances of obstruction by the evaluating stage 18. Therefore, it is advantageous to have the response sensitivity of the evaluating stage 18 change as a function of the actual position of the roof panel at any time. For this purpose, an evaluating stage as shown in FIG. 4 can be connected in series with either or both of the inputs $U_v$ and $U_b$ of the circuit arrangement shown in FIG. 3. An evaluation of the velocity signal $U_v$ or the acceleration signal $U_b$ as a function of the position signal $U_i$ is obtained by means of this evaluation stage.

The relationship of $U_i$ and $U_v$ and/or $U_b$ depends upon the specific roof design and is simulated by functional networks that are in conformity with the purpose of the apparatus. A control voltage $U_{st}=f(U_i)$ which is generated in that process, goes through a resistance 49 to a light emitting diode 50 of an optocoupler 51, whose output stage 52 forms a part of a voltage divider with a divider resistance 53. The signal $U_v$ or $U_b$ is applied to the voltage divider 52, 53. The evaluating signal $U_{vA}$ or $U_{bA}$, which is then delivered to the operational amplifiers 30, 31 or 32, 33 of FIG. 3, appears at the output 54 of the voltage divider 52, 53.

Figure 5:
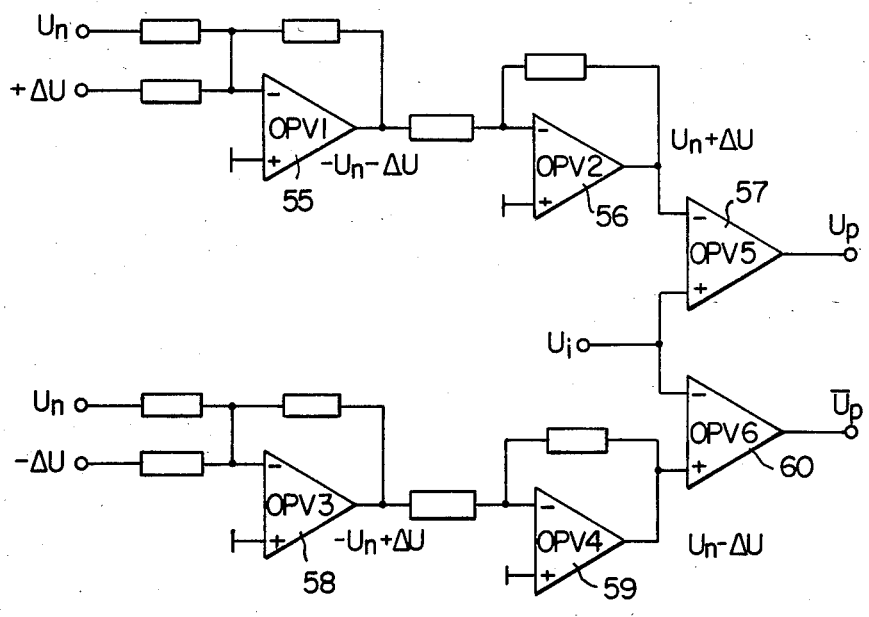
FIG. 5 is a diagram of a circuit for deactivating the protection circuit in a predetermined range.

Additionally, the protective circuit may be deactivated in at least one predetermined range of the path of movement of roof panel, especially, the closed position (zero position), since no danger of obstruction exists. For this purpose, the operational amplifier 34 and the inverter 44 of the circuit arrangement of FIG. 3 can be replaced by the structural group represented in FIG. 5. The circuit arrangement of FIG. 5 has the function of deactivating the protective circuit in a range corresponding to $U_n \pm \Delta U$. The signal $U_n + \Delta U$ is formed by way of an adder 55 and an inverter 56, and is then compared with the position signal $U_i$ in a comparator 57. $U_p = 1$ holds, if $U_n + \Delta U$ is $< U_i$. In a corresponding manner, the signal $U_n - \Delta U$ is formed by an adder 58 and an inverter 59 and is compared with the position signal $U_i$ in a comparator 60. $\overline{U}_p = 1$ holds when $U_n - \Delta U$ is $> U_i$. The signals $U_p$ or $\overline{U}_p$ are only generated outside of the area $U_n \pm \Delta U$ by this process. In this area, the obstruction signal $U_k$ is suppressed. For unsymmetrical disengaging areas with reference to the zero position, the voltages $+\Delta U$ and $-\Delta U$ can have different values.

It is also possible, in the manner indicated by a broken line 46 in FIG. 1, to also include the motor current in the evaluation. In particular, if a signal $U_{I1}$, which is indicative of or proportional to the motor current of the motor 11, is to be sent to the evaluating stage 18 through the line 46, as indicated in FIG. 3, the evaluating stage 18 will be provided with an additional comparator 48 (shown connected to OR-circuit 45 by a broken line) to whose non-inverting input the signal $U_{I1}$, is led. A signal $U_{Igr}$ is fed to the inverting input of the comparator 48, and is indicative of a current boundary value. If the current flowing in the motor 11 exceeds a predetermined current boundary value, for example, because of a defect in the sliding roof mechanism, or because of unusually bad road conditions, etc., a signal indicating a deficiency $U_{I2}$ will be generated as the output of the comparator 48 and will be delivered to another input of the OR-circuit 45, thereby triggering the obstruction signal $U_k$. In this way, overloading of the motor 11 can be avoided in a simple and reliable manner.

The described arrangement may be expanded in that, after the cessation of the obstruction signal or with a predetermined time delay thereafter, the closing process that was taking place before the occurrence of the obstruction signal is resumed automatically.

It should also be recognized that, even though the detailed description has been made relative to a displaceable roof panel, it is directly applicable to other closure parts, such as motor vehicle power windows and the like.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A device for driving a motor-operated closure part for an opening especially on a motor vehicle, having a protective circuit for interrupting a closing movement of the closure part when there is an indication that an object may be obstructing closure of the opening, wherein the protective circuit comprises a speed transmitting means for detecting a movement speed of the closure part within at least one range of a path of movement for the closure part that is critical with respect to an obstruction being encountered, and an evaluating stage that is responsive to at least one of a speed signal produced by the speed transmitting means and its rate of change with respect to time, for producing an obstruction signal that activates a control means acting to interrupt said closing movement.

2. A device according to claim 1, further comprising an actual-value position transmitting means for detecting the actual position of the closure part and a differentiating stage connected to an output side of said actual-value position transmitting means for the formation of the speed signal.

3. A device according to claim 2, wherein a differentiating stage is connected to an output side of the speed transmitting means, for the formation of an acceleration signal representing acceleration or deceleration of the closure part.

4. A device according to claim 1, wherein a differentiating stage is connected to an output side of the speed transmitting means, for the formation of an acceleration signal representing acceleration of deceleration of the closure part.

5. A device according to claim 1, wherein evaluating stage, in addition, is responsive to a driving signal from a transmitting device detecting one of a current and a driving voltage of a motor driving the closure part.

6. A device according to claim 5, wherein the response sensitivity of the protection circuit is changeable as a function of the actual position of the closure part.

7. A device according to claim 6, comprising means for deactivating the protection circuit in at least one predetermined range of the adjusting path of the closure part.

8. A device according to claim 1, wherein the response sensitivity of the protection circuit is changeable as a function of the actual position of the closure part.

9. A device according to claim 8, comprising means for deactivating the protection circuit in at least one predetermined ranged of the adjusting path of the closure part.

10. A device according to claim 1, wherein the evaluating stage has a logic circuit for distinguishing a closing movement of the closure part form an opening movement thereof.

11. A device according to claim 10, wherein the closure part is a slidable and liftable roof panel and the evaluating stage has a logic circuit for differentiating between the lifting and the sliding areas of movement.

12. A device according to claim 11, wherein the evaluating stage is provided with circuit components for suppressing insignificant signal fluctuations.

13. A device according to claim 12, wherein window comparators are provided as the circuit components for suppressing insignificant signal fluctuations.

14. A device according to claim 1, wherein the evaluating stage is provided with circuit components for suppressing insignificant signal fluctuations.

15. A device according to claim 14, wherein window comparators are provided as the circuit components for suppressing insignificant signal fluctuations.

16. A device according to claim 1, further comprising a desired-value position transmitting means for producing a selected desired-value position signal, said control means being operative for comparing the desired-value position signal with the actual position of the closure part and continuing movement of the closure part until the deviation therebetween has become zero, or said obstruction signal is produced.

17. A device according to claim 2, further comprising a desired-value position transmitting means for producing a selected desired-value position signal, said control means being operative for comparing the desired-value position signal with the actual position of the closure part and continuing movement of the closure part until the deviation therebetween has become zero, or said obstruction signal is produced.

18. A device according to claim 3, further comprising a desired-valued position transmitting means for producing a selected desired-value position signal, said control means being operative for comparing the desired-value position signal with the actual position of the closure part and continuing movement of the closure part until the deviation therebetween has become zero, or said obstruction signal is produced.

19. A device according to claim 1, wherein said control means is operative to reverse the direction of movement of said closure part when said obstruction signal is produced.

20. A device according to claim 1, wherein said closure part is a roof panel of a motor vehicle.

* * * * *